United States Patent
Kratomi

[11] 3,737,567
[45] June 5, 1973

[54] STEREOSCOPIC APPARATUS HAVING LIQUID CRYSTAL FILTER VIEWER

[76] Inventor: Shunsei Kratomi, No. 456, Maegawa, Kanagawa-ken, Odawara-shi, Japan

[22] Filed: Feb. 28, 1972

[21] Appl. No.: 229,966

[30] Foreign Application Priority Data

Oct. 25, 1971 Japan..................46/83947
Nov. 17, 1971 Japan..................46/91528
Nov. 24, 1971 Japan..................46/93706
Jan. 11, 1972 Japan..................47/4957

[52] U.S. Cl. ............178/6.5, 325/36, 325/66, 350/160 R, 352/57, 352/63
[51] Int. Cl......G03b 35/16, G03b 35/24, H04n 9/58
[58] Field of Search ..............178/6.5; 325/36, 325/66; 352/57, 63; 350/160 R; 250/199

[56] References Cited
UNITED STATES PATENTS 3,621,127 11/1971 Hope......................178/6.5
3,675,989 7/1972 Pietsch..................350/160 R

*Primary Examiner*—Howard W. Britton
*Attorney*—Robert D. Flynn, Stephen H. Frishauf, Leonard Holtz and Herbert H. Goodman

[57] ABSTRACT

A stereoscopic apparatus comprises at least one viewing device having a pair of liquid crystal filters (worn by an observer), the transparency of the liquid crystal filters being dependent on the intensity of an electric field applied thereto; at least one viewer controller; and a stereopair reproducing means, such as a motion picture projector and screen, a television receiver, a videotape player, or the like, having a synchronizing signal generator to generate signals to be transmitted to said viewer controller operating said viewer in such manner that a pair of liquid crystal filters, covering the right and the left eyes respectively, alternately exchange transparency and translucency in synchronism with each other, the alternation of right-eyed pictures and left-eyed pictures of stereopairs being displayed by the stereopair reproducing means.

38 Claims, 24 Drawing Figures

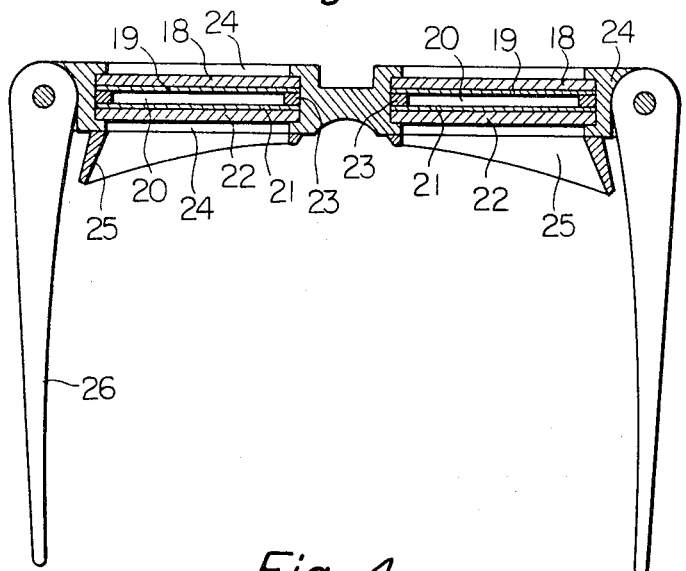
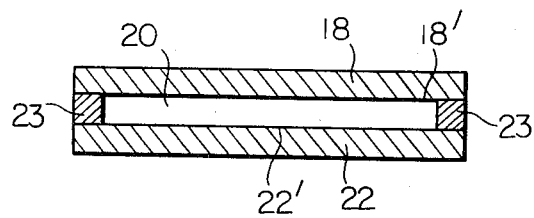
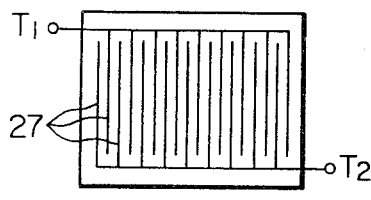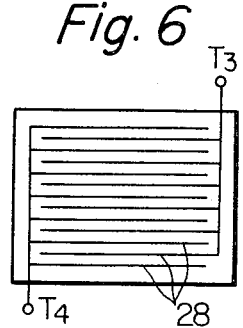

STEREOSCOPIC APPARATUS HAVING LIQUID CRYSTAL FILTER VIEWER

The present invention relates to a stereoscopic apparatus for reproducing in three dimensions, the pictures being reproduced either on a projection screen for motion pictures, on a kinescope for a television receiver, videotape player, or the like.

Several types of apparatus having similar objects are already known. However, they all have some inherent inconveniences and their applications are quite limited. For instance, an apparatus based on two complementary colors can not be applied for colored pictures; an apparatus based on polariscope not only makes the projector complicated and requires a special screen in the motion picture system, but also is not applicable to kinescopes and other similar image-display devices using light spot scanning; and an apparatus having a pair of mechanical shutters alternately blinding the eyes can not practically be used due to their noise, vibration and excessive size and weight.

The main object of the present invention is to provide a stereoscopic apparatus in which all the abovementioned inconveniences and disadvantages are eliminated.

Another object of the invention is to provide a system whereby projectors for motion pictures, television receivers, videotape players and the like presently in use may need minimal or no modification when they are incorporated in an embodiment of the stereoscopic apparatus in accordance with the present invention. Even after so modified, they can be still used for conventional service or for display of two-dimensional pictures at any desired time.

Still another object is to provide a system whereby every component of an embodiment of the apparatus in accordance with the invention may be of simple construction. Hence, the present invention finds various applications in industrial, public, and educational services, and even in home use.

SUMMARY OF THE INVENTION

Briefly, the stereoscopic apparatus in accordance with the present invention comprises at least one viewer device formed in resemblance to glasses or goggles, having a pair of liquid crystal filters the transparency of which is dependent on the electric field intensity applied thereto; at least one viewer controller coupled to said viewer device; and a stereopair reproducing means such as a motion picture projector and screen, a television receiver, a magnetic videotape player, a photoelectronic videotape player, or the like, having a synchronizing signal generator to generate synchronizing signals to be transmitted to the viewer controller operating the viewer device in such a manner that a pair of the liquid crystal filters respectively covering the right and the left eyes of an observer alternately exchange transparency and translucency in opposing synchronism with each other, the right-eyed picture and left-eyed picture of stereopairs being alternately displayed on the screen of the stereopair reproducing means.

BRIEF DESCRIPTION OF THE DRAWINGS

FIG. 3 shows a cross section of an embodiment of a viewer device in accordance with the invention;

FIGS. 4 and 7 show different cross sections of an embodiment of a liquid crystal filter for use in a viewer device in accordance with the invention;

FIGS. 5 and 6 show the patterns of the parallel line electrodes provided on each of the pair transparent plates of a liquid crystal filter of an embodiment of the viewer device in accordance with the invention;

FIGS. 16 and 18 belonging together show schematic mechanical and wiring diagrams of another embodiment of a synchronizing signal generator in accordance with the invention;

DETAILED DESCRIPTION OF THE INVENTION

Figure 1:
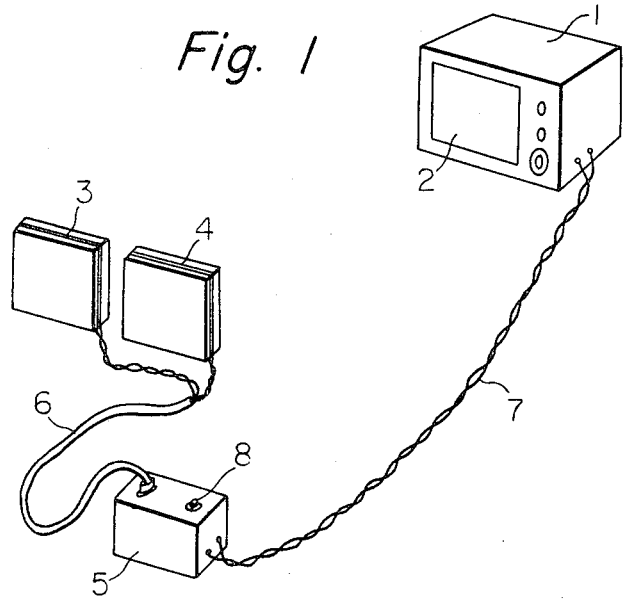
FIG. 1 is a perspective view of an embodiment of the stereoscopic apparatus incorporating a television receiver or a video player, in accordance with the invention.

Throughout the present specification, the same reference numerals are used to designate similar elements of the invention for ease of understanding and description Referring now to the drawings, and in particular to FIG. 1 which illustrates an embodiment of the present invention, a stereopair reproducing means 1 having a kinescope (such as a television set) 2 for stereopair display and a synchronizing signal generator (not shown) contained in the housing of the stereopair reproducing means 1, is connected to a viewer controller 5 by means of wires 7 transmitting synchronizing signals from the synchronizing signal generator to the viewer controller 5. A liquid crystal filter 3 for covering the left eye and another liquid crystal filter 4 for covering the right eye, both filters 3 and 4 forming a viewer in resemblance to a pair of glasses or goggles, are connected to the viewer controller 5 by means of wires 6. The viewer controller has a push button 8 of a switch PB for phase adjustment as shown in FIGS. 8 and 13 to 15.

The stereopair reproducing means 1 reproduces right-eyed and left-eyed pictures of stereopairs alternately on its screen for sufficiently short time intervals as will be described hereinbelow. It may be either a television receiver, a magnetic videotape player, a photo-electronic videotape player or any such display means that reproduces stereopairs on a screen by means of one or more light spots varying their brightness and scanning the screen. The screen of these light spot scanning type display means may be either the phosphor screen of a kinescope, a liquid crystal mosaic panel, a plasma-discharge matrix panel, or the like.

Figure 2:
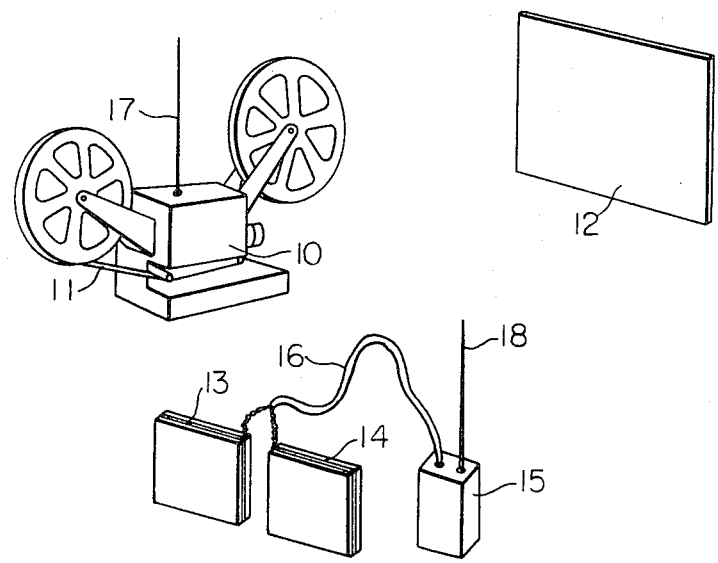
FIG. 2 is a perspective view of an embodiment of the stereoscopic apparatus incorporating a motion picture projector and screen, in accordance with the invention.

Another type of the stereopair reproducing means is a motion picture projection apparatus comprising projector and screen as shown in FIG. 2.

Referring to FIG. 2, a motion picture projector 10 carries film 11 on which right-eyed pictures and left-eyed pictures are alternately arranged, and projects the pictures on screen 12. A liquid crystal filter 13 for covering the left eye and another liquid crystal filter 14 for covering the right eye, both forming a viewer, are connected to a viewer controller 15 by means of wires 16. The projector 10 incorporates a synchronizing signal generator (not shown) and a radio transmitter transmits the synchronizing signal through its antenna 17. A radio receiver is incorporated in the viewer controller 15 and receives the synchronizing signal at its antenna 18.

It may be practical in certain instances for the viewer controller 15 to control a plurality of viewers. However, a sufficiently miniaturized viewer controller may be permanently mounted on each viewer. A plurality of viewer controllers may also be used, thus allowing a large number of persons in the audience.

The synchronizing signals may be transmitted from the synchronizing signal generator to one or more viewer controllers either by means of wires as shown in FIG. 1, by means of electro-magnetic waves or radio waves as shown in FIG. 2, by means of magnetic induction, by means of ultrasonic waves, or any other suitable transmission means.

The synchronizing signals generated by the generator fall into the following five categories:

1. signals having identical codes and being generated upon each alternation of the right-eyed and left-eyed pictures;
2. signals having identical codes and being generated upon each vertical deflection of the light spot in the kinescope or the like;
3. signals having two types of codes, being alternately generated, one upon disappearance of each right-eyed picture and the other upon disappearance of each left-eyed picture;
4. in a limited case of category 3, signals having two types of codes, one code signal for the right eye generated upon disappearance of the preceding left-eyed picture and extinguished upon disappearance of the corresponding right-eyed picture, and the other code signal for the left eye generated upon disappearance of the preceding right-eyed picture and extinguished upon disappearance of the corresponding left-eyed picture; and
5. in a limited case of category 4, signals generated upon disappearance of every other picture and extinguished upon disappearance of the corresponding picture.

Depending on the nature of the stereopair reproducing means and the type of the synchronizing signal, the viewer controller may be appendant to the stereopair reproducing means, and further may be integrated with the synchronizing signal generator. In these cases, transparency of each liquid crystal filter of the viewer is controlled by signals transmitted from the stereopair reproducing means to the individual liquid crystal filters.

Referring to FIG. 3, a liquid crystal filter comprises a liquid crystal 20, of the nematic type for instance, having such nature that its visible light transmission (or transparency) is dependent on the electric field intensity, which is held in the form of film between a pair of transparent plates 18 and 22 (clear glass plates for instance), and at least one set of transparent electrodes 19 and 21 (parallel-plate electrodes 19 and 21 for example) which are so arranged that they effectively change the electric field intensity to control transparency of the crystal film 20. The transparent electrode may be a uniform film or coating provided on the surface of the transparent plate. Stannic oxide, indium oxide, or other metal oxides, nickel, gold, or other metals may be coated on a plate for form a transparent electrode, by means of vacuum evaporation, impingement by an ion accelerator or by any other known suitable means.

Spacer 23 is provided to maintain a proper film thickness, and the space containing the liquid crystal 20 is hermetically sealed. The type of liquid crystal filter shown in FIG. 3 is generally known as a "liquid crystal cell".

A viewer in accordance with the invention and as shown in FIG. 3, comprises a pair of the abovedescribed liquid crystal filters and a frame 24 supporting the filters so that one filter covers the right eye and the other covers the left eye of a user. Temple pieces 26 may be attached to the frame 24. Skirts 25 may also be attached to the frame 24 to reduce adverse effect of the external light.

Referring to FIGS. 4 to 6 together, the paired transparent plates 18 and 22 of a liquid crystal filter have surfaces 18' and 22' being in contact with liquid crystal 20, and both or either one of the surfaces 18' and 22' is provided with a set of transparent parallel-line electrodes.

Transparent and electrically conductive parallel lines 27 (FIG. 5), provided on a transparent plate, every other line 27 being connected to one terminal $T_1$ and the rest of lines 27 being connected to the other terminal $T_2$, form a set of vertical parallel-line electrodes. In the same manner, transparent and electrically conductive parallel-lines 28 form a set of horizontal parallel-line electrodes having terminal $T_3$ connected to every other line 28 and terminal $T_4$ connected to the remaining lines 28.

The parallel-line electrodes may be formed on a piece of clear glass plate by means of a photoetching technique applied on indium oxide coating for instance, laid on the glass plate beforehand. Ion impinging techniques using an accelerator may also be applied to forming the parallel-line electrodes.

The distance between each two lines in the parallel-line electrodes should be about five microns or less, while the distance between the two plates in the parallel-plate electrodes is generally not less than ten microns, based on the presently available techniques. For this reason, less intensity of the electrical field which is required for controlling the transparency of a filter having parallel-line electrodes may increase the life span of the associated liquid crystal and increase the safety of the viewer.

Furthermore, the parallel-line electrodes allow a wide range of variation in setup of the liquid crystal filter, because each set of the electrodes occupies only one side of the liquid crystal film. For example:

1. a filter can comprise a set of parallel-line electrodes;
2. a filter can comprise two sets of parallel-line electrodes of identical orientation;
3. a filter can comprise a set of vertical parallel-line electrodes and a set of horizontal parallel-line electrodes; or
4. a filter can comprise a set of parallel-line electrodes at one side of the liquid crystal film and a transparent and electrically conductive surface at the other side, the electrically conductive surface being connected to the third terminal.

One or two of the surfaces of the paired transparent plates 18 and 22, being in contact with liquid crystal 20 and not being occupied by the parallel-line electrodes, may be rendered semi-reflective with metal oxide or metal coating, so that the brightness of the liquid crystal filter in a translucence state may be moderated to improve visibility of the picture where external light is intense. Either nickel or gold may suitably be used for applying the semi-reflective coating on clear glass plate.

Two or more pieces of liquid crystal filters of various types may be laminated to form one piece so that an optimum performance is achieved, depending upon operating conditions.

Figure 7:
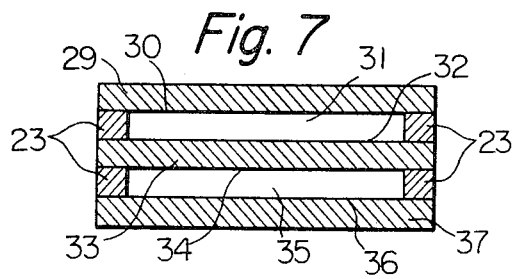

FIG. 7 shows a cross section of an embodiment of the laminated liquid crystal filter in accordance with the present invention, wherein a clear glass plate 29 has a surface 30 in contact with liquid crystal 31 and provided with a set of vertical parallel-line electrodes. A clear glass plate 33 has a semi-reflective and electrically conductive surface 32 in contact with liquid crystal 31 and connected to the third terminal, and a surface 34 being in contact with liquid crystal 35 and provided with a set of horizontal parallel-line electrodes. A clear glass plate 37 has a semi-reflective and electrically conductive surface 36 in contact with liquid crystal 35 and connected to the third terminal.

The electrical energy for transparency control is imposed on the electrodes of the liquid crystal filter either by supplying direct current or by supplying alternating current.

In general, the liquid crystal has at least two problems in association with the application thereof to the stereoscopic viewer. One is a relatively short life span and the other is relatively long fall time of translucency after the electric field has been removed. The latter problem may be critical where a stereopair reproducing means of the scanning type is incorporated with the stereoscopic apparatus in accordance with the invention.

Several ways are conceivable for improvement of the liquid crystal filter with respect to the fall time problem, as follows:

1. The electrodes can be short-circuited immediately after they have been disconnected from the power source for transparency control;
2. The electrodes can be connected to an auxiliary power source of alternating current having a sufficiently high frequency to exert a quenching effect upon the liquid crystal, immediately after they are disconnected from the main power source;
3. The electrodes can be continuously connected to an auxiliary power source of alternating current having sufficiently high frequency to exert a latent quenching effect upon the liquid crystal at such an intensity as the electric power from the main power source is not prohibited from controlling the filter transparency;
4. Particularly relating to the filter having a set of parallel-line electrodes at one side of the liquid crystal film and an electrically conductive surface at the other side, the parallel line electrodes and the electrically conductive surface can be connected to an auxiliary power source of alternating current having sufficiently high frequency to exert a quenching effect upon the liquid crystal, immediately after the parallel-line electrodes are disconnected from the main power source; or
5. Particularly relating to the filter described in the preceding category, one pole of the parallel-line electrodes and the electrically conductive surface are continuously connected to an auxiliary power source of alternating current having sufficiently high frequency to exert a latent quenching effect upon the liquid crystal at such an intensity as the parallel-line electrodes are not prohibited from controlling the filter transparency.

One or more viewer controllers are incorporated in the stereoscopic apparatus in accordance with the invention. Each viewer controller comprises a switching circuit which connects and disconnects the electrodes of each liquid crystal filter of the viewer with a power source of either direct or alternating current in such manner that one filter covering the right eye and the other filter covering the left eye of a person in the audience alternately exchange transparency and translucency, one being transparent while the other is translucent, according to the synchronizing signals transmitted from the synchronizing signal generator. The switching circuit may further have such a switching function that the electrodes of each liquid crystal filter are either short-circuited or connected to an auxiliary power source capable of exerting a quenching effect upon the liquid crystal.

Referring to FIGS. 8 to 14, the following nomenclature is employed: R — relay coil; and r — relay contact. The subscripts denote: 1 — Transfer Relay; 2 — Initiating Relay; and 3 — Disconnecting Relay.

Figure 14:
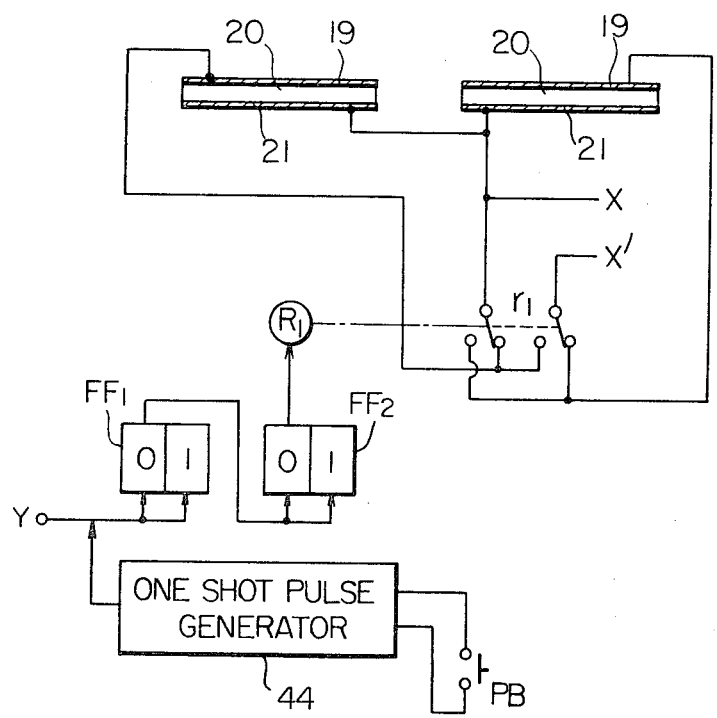
Figure 15:
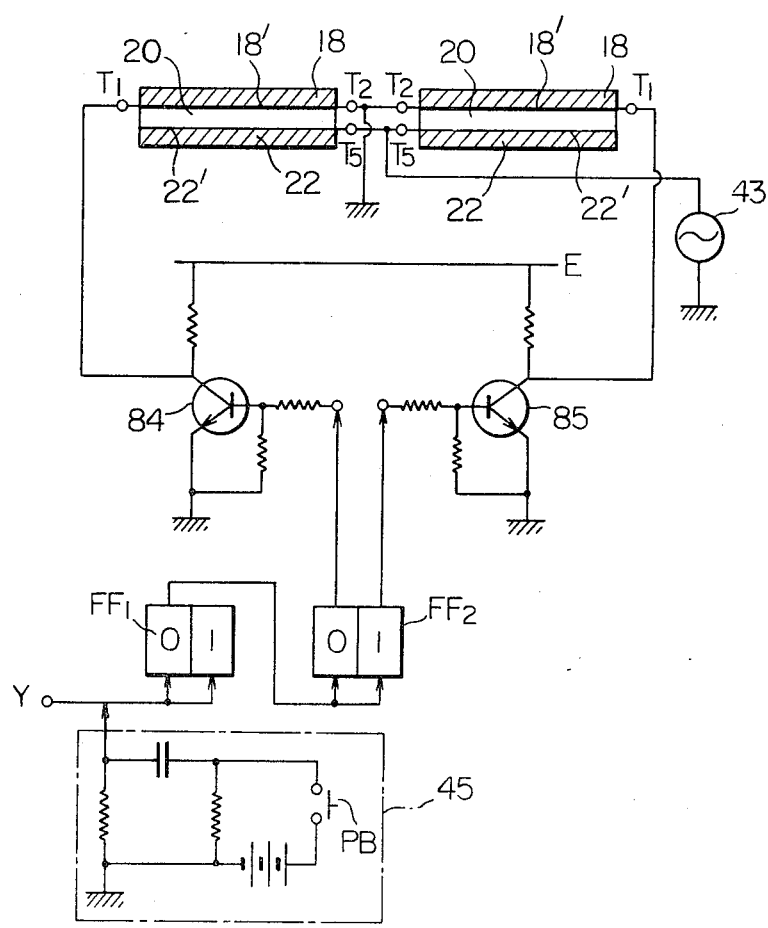

Electromagnetic relays are employed throughout the circuit diagrams of FIGS. 8 to 22 except FIG. 15, for ease of understanding the logic in the circuits. However, as should be apparent, transistors and other contactless switching elements may preferably be used in place of the illustrated relays. The present invention is not limited in the types of switching elements used.

Figure 8:
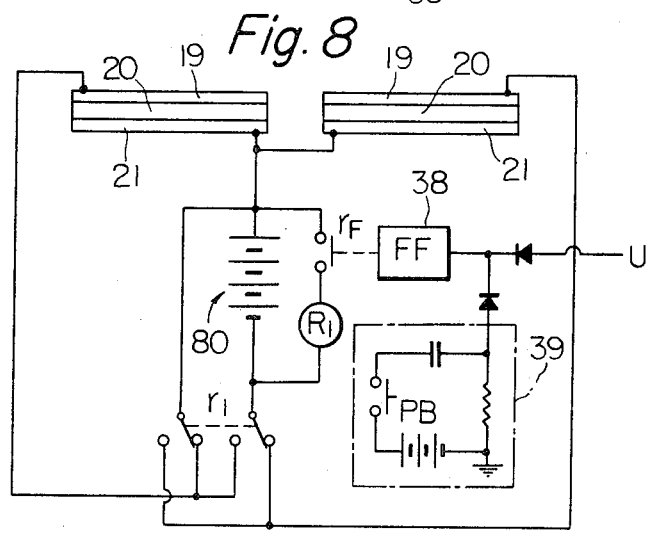
FIGS. 8 to 15 and 19 show respective schematic wiring diagrams of embodiments of viewer controllers in accordance with the invention.

Referring now to FIG. 8, this viewer controller receives a synchronizing signal of category 1 (discussed hereinabove) at terminal U.

The electrodes 19 and 21 of each liquid crystal filter 20, respectively, are connected across a D.C. source through relay contacts $r_1$. A flip-flop circuit 38 has its input connected to terminal U and controls a switch $r_F$ by the output signals thereof. A one shot pulse generator 39 for phase adjustment is triggered upon each operation of the push button switch PB to feed an input to flip-flop 38.

Figure 9:
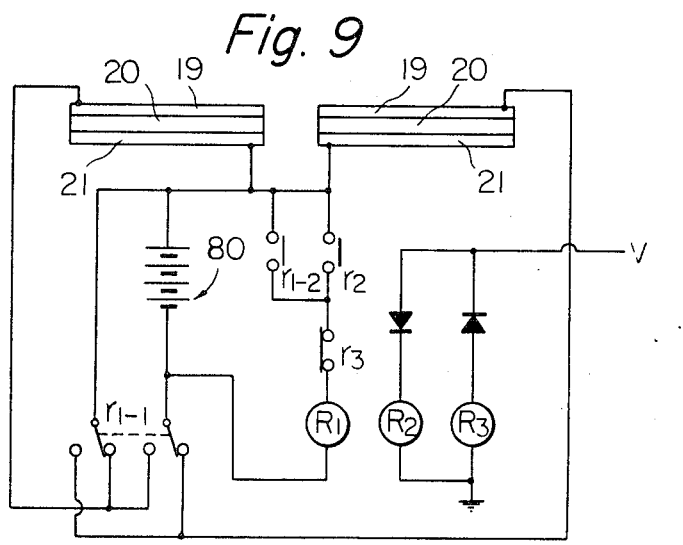

Referring to FIG. 9, this viewer controller receives the synchronizing signal of category 3 (discussed hereinabove) at terminal V and the one shot pulse generator 39 of FIG. 8 is eliminated.

Figure 10:
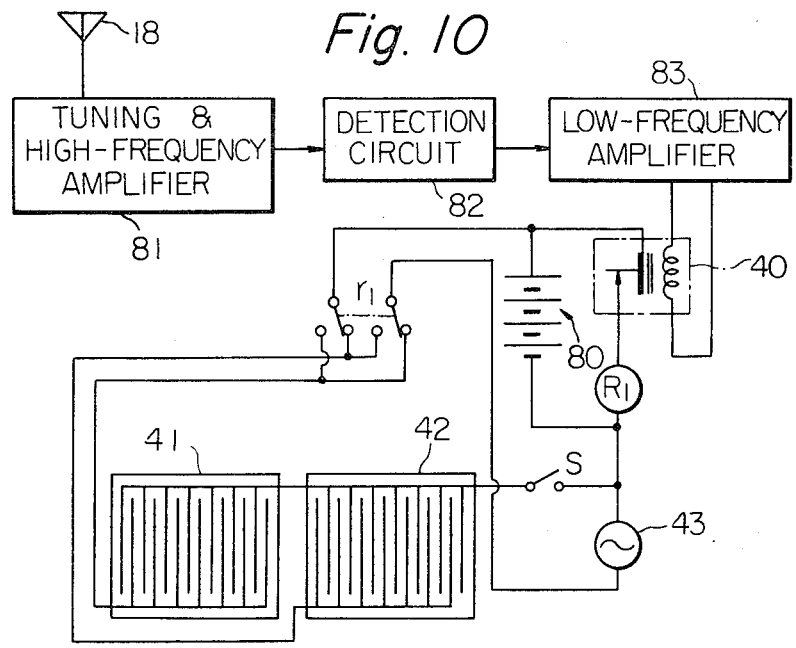

Referring to FIG. 10, this viewer controller has an antenna 18 receiving the synchronizing signal of category 5 transmitted by radio. The signal received at antenna 18 is fed to a high frequency amplifier 81, detection circuit 82 and low frequency amplifier 83, in order. The output of amplifier 83 is fed to a signal selection means 40 which is connected to the liquid crystal filter 41 for the left eye, and to the liquid crystal filter 42 for the right eye via relay contacts $r_1$. 43 denotes the quenching power source (a.c. in this case) and S denotes a disconnecting switch. This viewer controller connects the electrodes of each liquid crystal filter 41,42 to the quenching power source 43 immediately after they have been disconnected from the main power source 80.

Figure 11:
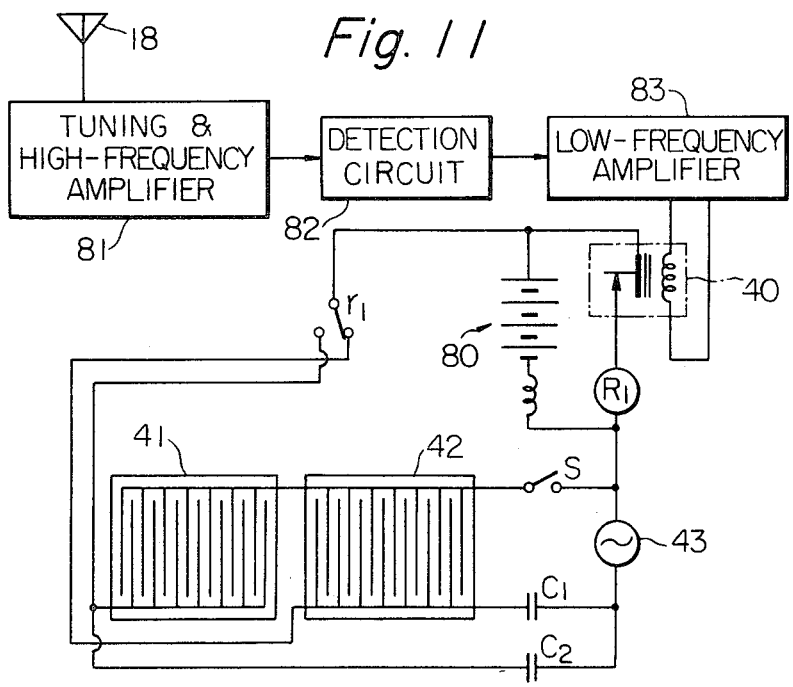

Referring to FIG. 11, this viewer controller receives at antenna 18 the synchronizing signal of category 5 transmitted by radio, and processes same through circuits 81–83 as in FIG. 10. The quenching power source 43 is continuously connected to the electrodes of each liquid crystal filter 41,42 through blocking capacitors $C_1$ and $C_2$.

Figure 13:
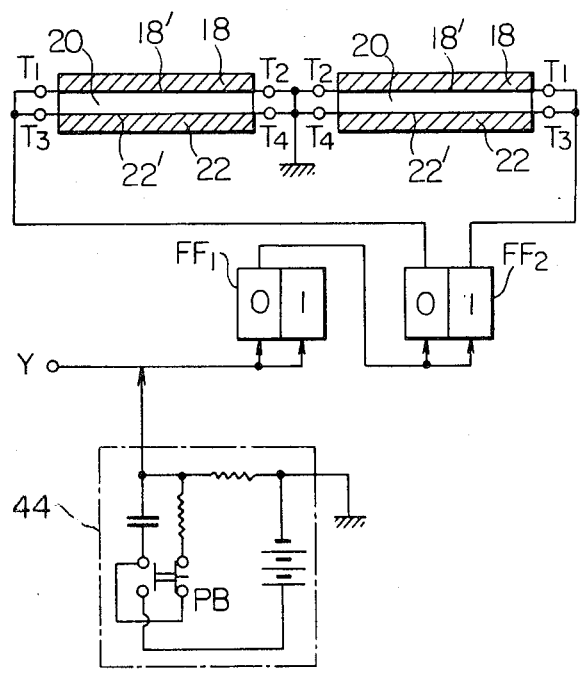

FIG. 13 is another viewer controller wherein the synchronizing signals are received at terminal Y and are counted by a quaternary counting circuit consisting of a first flip-flop circuit $FF_1$ and a second flip-flop circuit $FF_2$. The one shot pulse generator 44 used for phase adjustment, is triggered by push button switch PB. Each liquid crystal filter of the viewer comprises a transparent plate 18, a set of parallel-line electrodes provided on the surface 18' of the plate and connected to terminals $T_1$ and $T_2$, another set of parallel-line electrodes provided on the surface 22' of a transparent plate 22 and connected to terminals $T_3$ and $T_4$, and liquid crystal 20.

Referring to FIG. 14, a power source of either direct current or alternating current is connected at terminals X and X'. Reference numerals 19 and 21 respectively denote each pole of the electrodes in the liquid crystal filters of the viewer and 20 denotes the liquid crystal.

Referring to FIG. 15, a pair of transistors 84 and 85 are employed in place of the transfer relay $R_1$ of the preceding circuits. A power source is connected at terminal E. An auxiliary power source 43 for latent quenching to be exerted on the liquid crystal 20 is permanently connected across terminals $T_2$ and $T_5$. Each liquid crystal filter of the viewer comprises a transparent plate 18, a set of parallel-line electrodes provided on the surface 18' of the plate and connected to terminals $T_1$ and $T_2$, liquid crystal 20, and transparent and electrically conductive coating provided on the surface 22' of a transparent plate 22 and connected to terminal $T_5$. Reference numeral 45 denotes a one shot pulse generator for phase adjustment.

In connection with the viewer shown in FIG. 15, a variation of the viewer controller may be so constructed that a quenching power source is connected to the terminals $T_2$ and $T_5$ of each liquid crystal filter immediately after the terminals $T_1$ and $T_2$ of respective filters have been disconnected from the main power source, thereby eliminating the permanent connection of the latent quenching power source 43 as shown in FIG. 15.

Figure 12A:
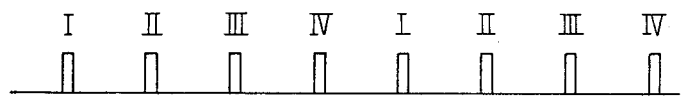
Figure 12B:
Figure 12C:

FIG. 12 shows the phase relation between the vertical deflection signal (FIG. 12A) of a conventional scanning type display means (such as a television receiver), the output signals (FIG. 12B) of the flip-flop circuit $FF_1$ of FIGS. 13–15 and the output signals (FIG. 12C) of the second flip-flop circuit $FF_2$ of FIGS. 13–15. The two flip-flop circuits $FF_1$ and $FF_2$ form a quaternary counting circuit that counts the vertical deflection signals (A). The vertical deflection signal comprises pulses (I) for the first field of the $(2n-1)$th frame carrying the left-eyed pictures, pulses (II) for the second field of the same frame, pulses (III) for the first field of $(2n)$th frame carrying the right-eyed pictures and pulses (IV) for the second field of the same frame, where n is an integer, said pulses being sequentially generated in the order determined by n.

In the viewer controllers of FIGS. 13 to 15, which receive the synchronizing signal in synchronism with the vertical deflection signal (A), the phase relation of the signals must be maintained as shown in FIG. 12 so that stereopictures are properly viewed. The one shot pulse generator 44 of FIG. 13 and 14, and 45 of FIG. 15, is provided for phase adjustment.

With respect to FIGS. 8 to 11, 14 and 19, it should be apparent that a viewer having parallel-plate electrodes and a viewer having parallel-line electrodes are interchangeable, the only change required being with respect to the required voltage to be applied to the electrodes.

Figure 16:
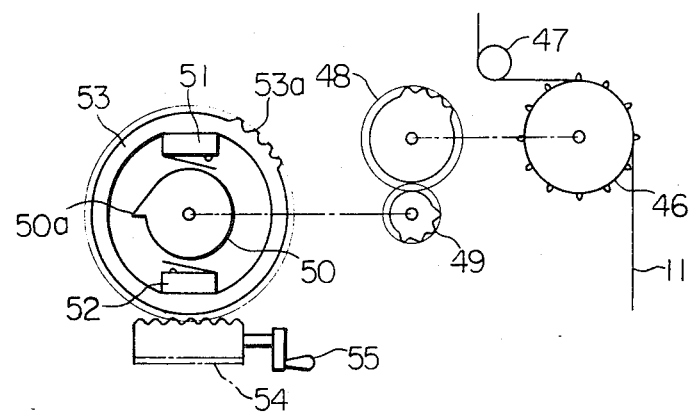
FIGS. 16 and 17 belonging together show schematic mechanical and wiring diagrams of an embodiment of a synchronizing signal generator in accordance with the invention.

FIG. 16 shows a schematic mechanical diagram of an embodiment of a synchronizing signal generator to be attached to a motion picture projector, film 11 having a series of alternately arranged stereopairs thereon. The perforations of film 11 are engaged by sprocket 46 and guide roller 47 to provide drive for film 11. A set of gears 48 and 49 transmit the rotation of the sprocket 46 to a cam 50 in such manner that the cam 50 having an actuator portion 50a makes a half rotation for each frame movement of the film 11. The actuator 50a of the cam 50 rests between two microswitches 51 and 52 when the film is at rest. Hence, each of the microswitches 51,52 is actuated alternately at every other frame advance of the film. Holder 53 carrying the switches 50, 51 is provided with teeth 53a on its circumference and is rotated for signal phase adjustment by means of wormgear 54 with handle 55.

Figure 17:
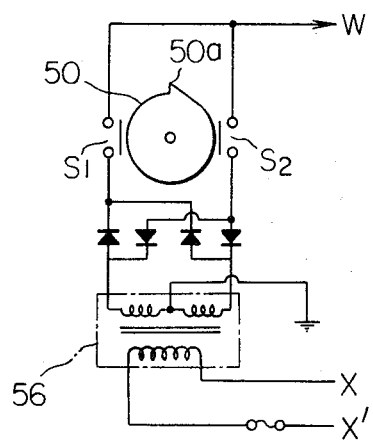

Referring to FIG. 17 showing the schematic wiring diagram of the FIG. 16 embodiment, cam 50 closes contacts $S_1$ of switch 51 to generate a pulse of positive polarity upon each disappearance of the left-eyed pictures and closes contacts $S_2$ of switch 52 to generate a pulse of negative polarity upon each disappearance of the right-eyed pictures. The synchronizing signals thus generated are fed out from terminal W. Transformer 56 decreases the voltage of the power source X — X'. The synchronizing signals generated by this generator are accepted by the viewer controller as shown in FIG. 9 at terminal V for instance.

Figure 18:
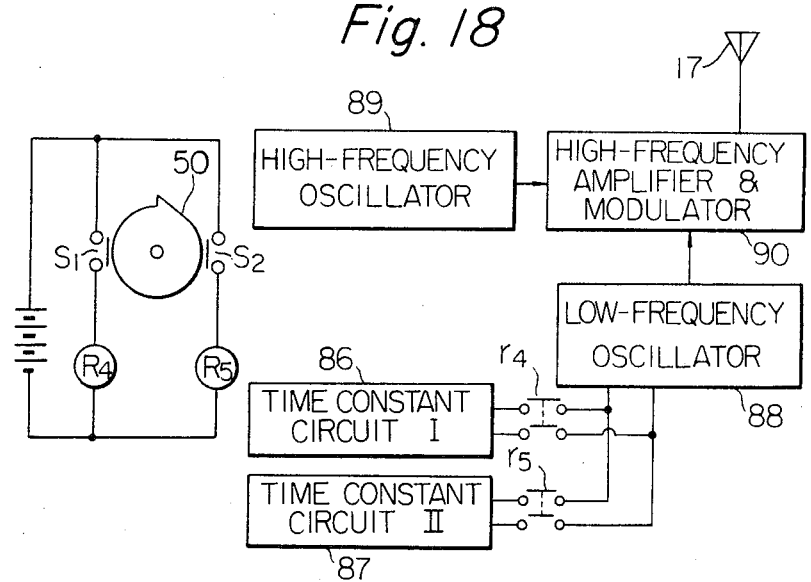

FIG. 18 shows a modification of the synchronizing signal generator shown in FIGS. 16 and 17. When contacts $S_1$ have been closed to energize realy coil $R_4$, the associated relay contact $r_4$ is closed to engage a first time constant circuit 86 and a signal having a frequency determined by the first time constant circuit 86 is modulated my means of circuits 88–90 and sent out from antenna 17 by radio. Likewise, when contacts $S_2$ have been closed to energize relay coil $R_5$, the associated relay contact $r_5$ is closed to engage a second time constant circuit 87 and a signal having another frequency determined by the second time constant circuit 87 is modulated and sent out.

Figure 19:
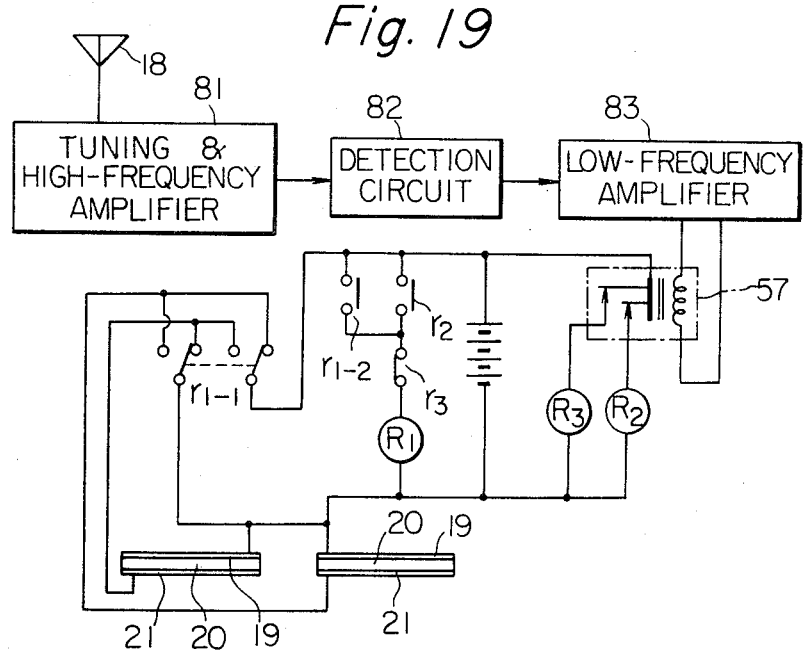

FIG. 19 shows an embodiment of a viewer controller that accepts the synchronizing signals generated by, and transmitted from, the signal generator shown in FIG. 18. The synchronizing signal received at antenna 18 and demodulated by the radio receiver circuits 81–83 are fed to signal selection means 57 and energize either relay coil $R_2$ or $R_3$ according to its frequency. No phase adjustment means is required in this controller.

Some known motion picture projectors are driven in synchronism with signals generated by a player of sound-recorded tape having pulses recorded on it for synchronizing the sound with the movement of each picture frame of the associated film. In apparatus of this type, the pulses recorded on the sound tape and reproduced by the player are utilized as synchronizing signals to be delivered to the viewer controller. Thus the tape player may take the place of the synchronizing signal generator in the synchronizing signal generator in the stereoscopic apparatus in accordance with the invention.

For the stereoscopic television broadcast to achieve commercial application, at least following requirements should be fulfilled:

1. The conventional television receivers presently in use should be able to receive the stereoscopic television signal, and should be able to reproduce clear two-dimensional pictures therefrom without difficulty; and
2. The specially designed stereoscopic television receivers should not encounter problems when receiving the conventional television signal, but should reproduce clear two-dimensional pictures.

Figure 20:
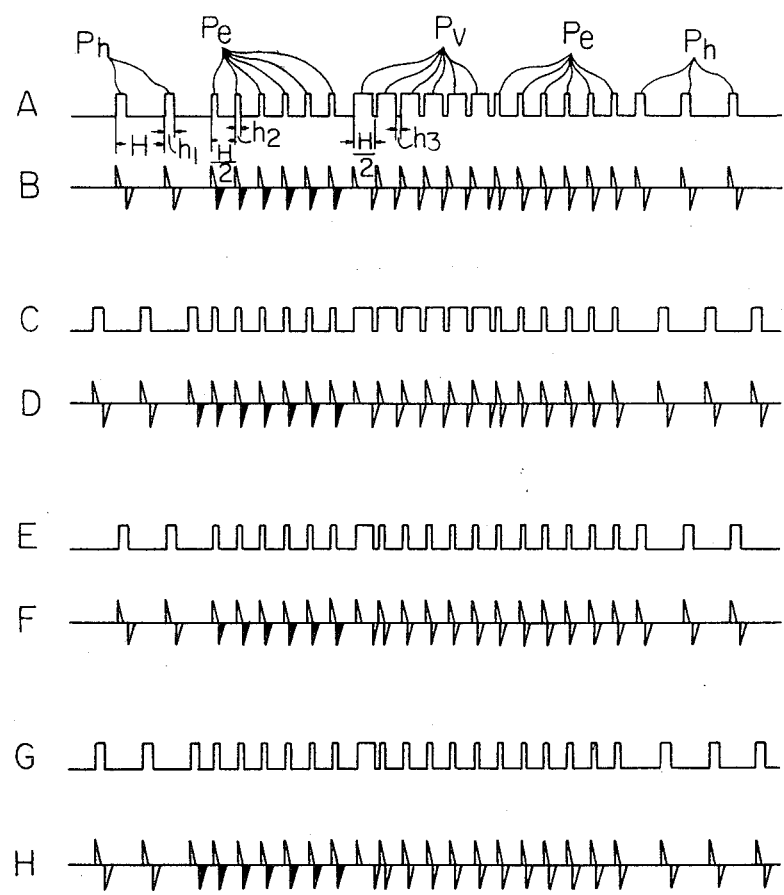
FIG. 20 shows a typical pattern of the scanning signal alignment for the stereoscopic video signal in accordance with the invention.

FIG. 20 shows a novel sequence of scanning signals to be incorporated with stereoscopic video signals, that may be used to fulfill the above two requirements.

Signal sequence A of FIG. 20 shows a sequence of scanning signals for the first field of the $(2n - 1)$th frame where $n$ is an integer number and wherein a plurality of equalizing pulses $Pe$, a plurality of vertical synchronizing pulses $Pv$, a plurality of equalizing pulses $Pe$ and a plurality of horizontal synchronizing pulses are aligned in the described sequence. Each of the equalizing pulses $Pe$ has identical wave form, identical amplitude and an identical pulse width of $h_2$, and their repetition rate is $H/2$. Each of the vertical synchronizing pulses has identical wave form, identical amplitude and an identical pulse width of $(H/2) - h_3$, and their repetition rate is $H/2$. Each of the horizontal synchronizing pulses has identical wave form, identical amplitude and an identical pulse width of $h_1$, and their repetition rate is $H$.

Signal sequence C of FIG. 20 shows a sequence of scanning signals for the second field of the $(2)th - 1)$th frames. The pattern of sequence C is identical with sequence A except that the first equalizing pulse follows the last horizontal synchronizing pulse at a time interval of H and the first horizontal synchronizing pulse follows the last equalizing pulse at a time interval of $H/2$ in sequence A, while the first equalizing pulse follows the last horizontal synchronizing pulse at a time interval of $H/2$ and the first horizontal synchronizing pulse follows the last equalizing pulse at a time interval of H in sequence C. As should be apparent to those skilled in the television art, the signal sequences A and C alternately disposed are widely in use for television, videotape recording, and the like.

Signal sequence E of FIG. 20 shows a sequence of scanning signals for the first field of the $(2n)$th frame. The pattern of sequence E is identical with A except that each of the second and further vertical synchronizing pulses is replaced by a pulse identical or proximate to the equalizing pulse.

Signal sequence G of FIG. 20 shows a sequence of scanning signals for the second field of the $(2n)$th frame. The pattern of sequence G is identical with C except that each of the second and further vertical synchronizing pulses is replaced by a pulse identical or proximate to the equalizing pulse.

Signal sequences B, D, F and H of FIG. 20 shows sequences of pulses obtained by differentiation of the pulses in sequences A, C, E and G, respectively.

The disposition of positive pulses in sequence B of FIG. 20 is identical to the same pulses in sequence F, and the disposition of positive pulse in sequence D is identical to the same pulses in sequence H.

As to the negative pulses of sequences B and F of FIG. 20, six pulses marked by black filling and disposed at time spacings of $H/2$ are led by a time interval of $H - (h_1 - h_2)$ and followed by a time interval of $H - (h_2 + h_3)$. As to negative pulses of sequences D and H, seven pulses marked by black filling and disposed at time spacings of $H/2 - (h_1 - h_2)$ and $H/2$, are led by a time interval of H and followed by a time interval of $H - (h_2 + h_3)$. The last one of the pulses marked by black filling in each of sequences B, D, F and H is disposed at identical phasing with respect to the scanning signals.

In a receiver, for the sequences of the differentiated pulses, the positive pulses may be adopted as the horizontal deflection signals and the last pulse in each series of the black-marked negative pulses may be adopted as the vertical deflection signals. Furthermore, the black-marked negative pulse in a series may be utilized for field discrimination and the vertical synchronizing pulses in a series may be utilized for frame discrimination.

The right-eyed pictures of the stereopairs may be carried by $(2n - 1)$th frames, and the left-eyed pictures may be carried by $(2n)$th frames.

When the television signal incorporating the scanning signal shown in FIG. 20 is received by a conventional television receiver, $(2n)$th frames are skipped over because the vertical synchronizing pulses in sequences E and G can not produce a sufficiently high voltage when integrated, to trigger the vertical deflection circuit. Thus, the left-eyed pictures are eliminated, while leaving the right-eyed pictures to be reproduced. Hence, clear two-dimensional pictures may be reproduced by the receiver at one half of the conventional frequency. The visual result is satisfactory, since the interval between frames is still in the range of the visual retentivity time.

Figure 21:
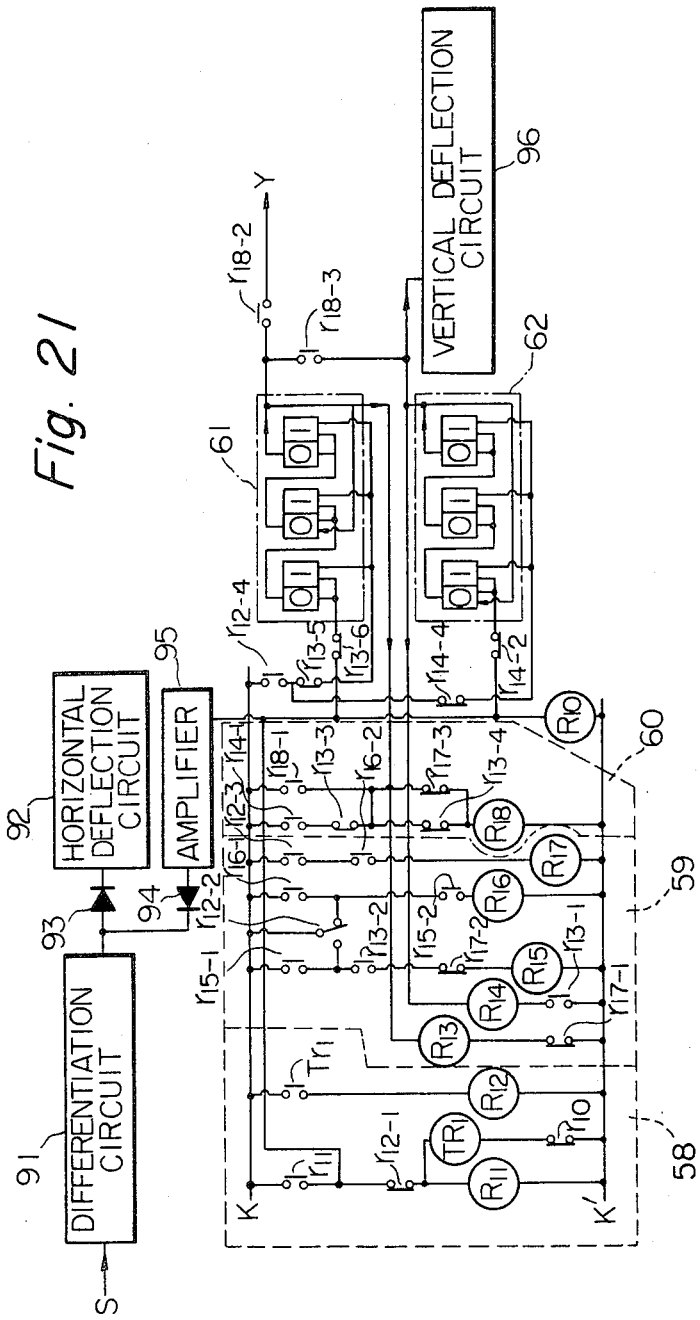
FIG. 21 is a schematic wiring diagram of an embodiment of the scanning signal circuit of a stereopair reproducing means in accordance with the invention.
Figure 22:
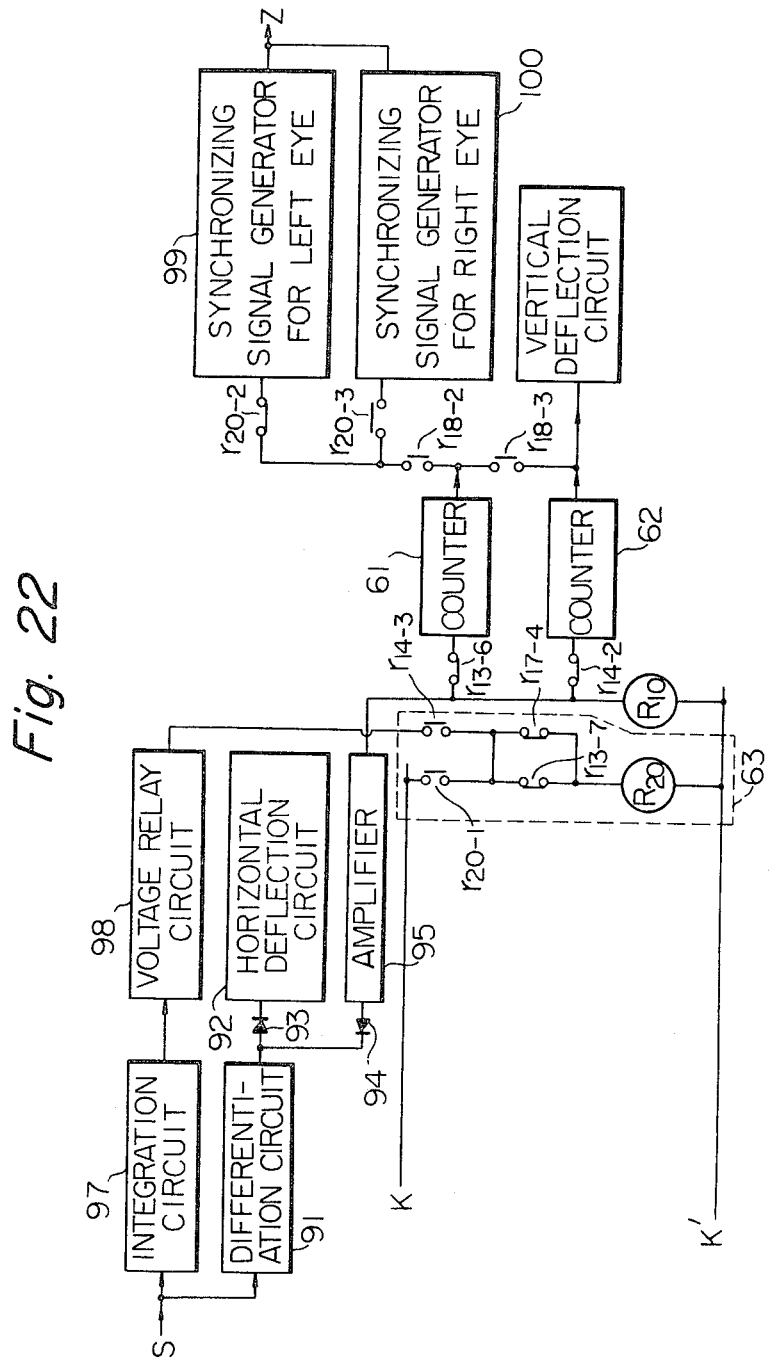
FIG. 22 shows a schematic wiring diagram of an embodiment of a frame discrimination circuit to be incorporated with the scanning signal circuit of FIG. 21.

Referring to FIGS. 21 and 22, the following nomenclature is employed: R — relay coil; and r — relay contact. Each subscript designates the relay coil and contacts associated with each other, respectively.

Referring now to FIG. 21, there is shown a circuit for use with the signal sequences of FIG. 20. The scanning signal S assumptively having positive polarity, is first differentiated by differentiation circuit 91, then the positive components of the output pulses are fed to the horizontal deflection circuit 92 via a forward connected diode 93, and the negative components are fed to the pulse selection circuit via a backward connected diode 94 and amplifier 95.

The pulse selection circuit comprises a pulse discrimination circuit 58, a pulse counting circuit consisting of two counters 61 and 62, a lock circuit 59 and a choke circuit 60. The pulse discrimination circuit 58 is a timing limit switch in nature, and has a least upper bound of time $h$. The length of time $h$ is determined by:

$$H/2 < h < H - (h_1 - h_2) \text{ and } H - (h_2 + h_3)$$

where:
$H$ is the repetition rate of the horizontal synchronizing pulse;
$h_1$ is the width of the horizontal synchronizing pulse;
$h_2$ is the width of the equalizing pulse; and
$h_3$ is the width of the gap between vertical synchronizing pulses.

Timing relay $TR_1$ of ON-delay type closes its contact $Tr_1$ when it has been kept energized for the length of time $h$, while it is reset and re-energized upon each momentary actuation of relay $R_{10} - r_{10}$ prior to its action. Thus, the pulse discrimination circuit 58, receiving the pulses of negative polarity from the differentiation circuit 91, permits only the pulses which arrive at shorter intervals than $h$, to be fed further to the pulse counting circuit 61,62.

The first counter 61 of the counting circuit counts up to the same number as the number of equalizing pulses leading the vertical synchronizing pulses in the scanning signals, namely a senary counter in the particular instance described, and the second counter 62 counts up to one more number than the first counter, namely a septenary counter. Both counters 61 and 62 are reset to their initial state of counting upon each detection by the pulse discrimination circuit 58 of time intervals between adjacent pulses in excess of the least upper bound of time h.

The lock circuit 59 locks the two counters 61 and 62 upon attainment of full count by the first counter 61 with respect to the first fields of scanning, and upon attainment of full count by the second counter 62 with respect to the second fields, and unlocks them upon receipt by the discrimination circuit 58, of a pulse corresponding to the second horizontal synchronizing pulse with respect to the first fields of scanning, and upon receipt of a pulse corresponding to the first horizontal synchronizing pulse with respect to the second fields.

The choke circuit 60 chokes output signals of the first counter 61 in the second field of scanning, so that the first counter 61 delivers output signals to the vertical deflection circuit 96 and to terminal Y in the first field of scanning and the second counter 62 delivers output signals to the vertical deflection circuit 96 in the second field of scanning.

The synchronizing signals are transmitted from terminal Y to the terminal U of a viewer controller such as shown in FIG. 8 for instance, upon each vertical deflection in the first fields.

An embodiment of the stereopair reproducing means incorporating the pulse selection circuit shown in FIG. 21 can receive conventional television signals carrying either normal pictures or stereopairs to properly reproduce either normal pictures in two dimensions or three dimentional stereopairs accordingly.

Referring to FIG. 22, an integration circuit 97, a voltage relay circuit 98, a frame sort out circuit 63 and a pair of synchronizing signal generators 99 and 100, signal generator 99 generating signals for the right eye and the other signal generator 100 generating signals for the left eye, may be additionally incorporated in the pulse selection circuit as shown in FIG. 21. Similar elements are given the same reference numerals in FIGS. 21 and 22.

The scanning signal S is fed to both the differentiation circuit (as in FIG. 21) and the integration circuit 97. The output voltage level from the integration circuit 97 is then compared by the voltage relay circuit 98 against a least upper bound of voltage. The least upper bound of voltage is so determined that each series of the vertical synchronizing pulses in $(2n - 1)$th frames exceeds the least upper bound voltage after being integrated, while each series of the vertical synchronizing pulses in $(2n)$th frames does not reach it after being integrated. Thus, the voltage relay circuit 98 delivers a signal to the frame sort out circuit 63 upon receipt of the integrated signal of each series of synchronizing pulses in $(2n - 1)$th frames. The operated relays of the frame sort out circuit 63 transfer the output signals of the first counter 61 to the synchronizing signal generator 99 for the right eye when a series of vertical synchronizing pulses in $(2n - 1)$th frames carrying the right-eyed pictures of the stereopairs have been received by the integration circuit 97, and to the synchronizing signal generator 100 for the left eye when a series of vertical synchronizing pulses in $(2n)$th frames carrying the left-eyed pictures have been received by the integration circuit 97. The synchronizing signals are transmitted from terminal Z to terminal V of a viewer controller such as shown in FIG. 9 for instance.

An additional circuit may be provided in the circuit of FIG. 22 so that the output signals from the voltage relay circuit 98 are permitted, when desired, to trigger the vertical deflection circuit, thus enabling persons in the audience to look at normal two-dimensional pictures using no liquid crystal viewer, while receiving the television signal incorporating the scanning signals of FIG. 20 and carrying stereopairs.

A conventional television signal may carry the stereopairs and a conventional receiver may reproduce them as it would reproduce pictures from conventional signals. However, not only the right-eyed and the left-eyed pictures, but also the first and the second frames are not discriminated in the conventional receiver, thus necessitating such types of viewer controllers as shown in FIGS. 13 to 15. Together with one of these viewer controllers the conventional videotape player and the like may readily be incorporated in the stereoscopic apparatus in accordance with the invention to reproduce stereopairs. In these applications, the synchronizing pulses to trigger the vertical deflection circuit of the video display means are tapped out and fed to the appropriate viewer controller.

I claim:
1. A stereoscopic apparatus comprising:
   a stereopair reproducing means for displaying right-eyed and left-eyed pictures of stereopairs alternately on its screen at short alternate time intervals;
   a synchronizing signal generator associated with said stereopair reproducing means and generating synchronizing signals in synchronism with alternation of said right-eyed and left-eyed pictures;
   at least one viewer device comprising a pair of liquid crystal filters, each of said filters being adapted to cover the right and left eyes of an observer, respectively, each filter having at least one layer of liquid crystal held in the form of a film and at least one set of transparent electrodes, the transparency of said liquid crystal filters being dependent upon the electric field intensity generated by said electrodes; and at least one viewer controller receiving said synchronizing signals generated by said synchronizing signal generator and controlling the power applied to said electrodes to thereby vary the electric field and the transparency of said liquid crystal filters such that a pair of said liquid crystal filters covering the right and the left eyes respectively of an observer alternately exchange transparency and translucency in synchronism with each other and in synchronism with alternation of said right-eyed and left-eyed pictures being displayed by said stereopair reproducing means.

2. Apparatus as claimed in claim 1 wherein said synchronizing signals are coupled to said at least one viewer controller by means of wires connecting said synchronizing signal generator to said at least one viewer controller.

3. Apparatus as claimed in claim 1 wherein said synchronizing signal generator includes a radio transmitter and said viewer controllers include a radio receiver, said synchronizing signals being coupled to said at least one viewer controller by means of radio.

4. Apparatus as claimed in claim 1 wherein said synchronizing signal generator generates synchronizing signals having identical code formats in synchronism with alternation of said right-eyed and left-eyed pictures.

5. Apparatus as claimed in claim 1 wherein said synchronizing signal generator generates a synchronizing signal for exclusive one of the right and left eyes, corresponding to disappearance of the opposite eye picture and persisting until the other eye picture disappears.

6. Apparatus as claimed in claim 1 wherein said viewer controller is at least partially appendant to said stereopair reproducing means.

7. Apparatus as claimed in claim 6 wherein said viewer controller is integrated with said synchronizing signal generator.

8. Apparatus as claimed in claim 1 wherein said synchronizing signal generator generates two types of synchronizing signals alternately, signal for the right eye being coupled to the left eye filter and corresponding to disappearance of the left-eyed pictures, and signal for the left eye being coupled to the right eye filter and corresponding to disappearance of the right-eyed pictures.

9. Apparatus as claimed in claim 8 wherein said synchronizing signal for the right eye persists until the right-eyed picture disappears and said synchronizing signal for the left eye persists until the left-eyed picture disappears.

10. Apparatus as claimed in claim 1 wherein said stereopair reproducing means includes a film-type motion picture projector and projection screen, and said synchronizing signal generator generates said synchronizing signals in synchronism with the movement of each picture frame of the film.

11. Apparatus as claimed in claim 10 wherein said synchronizing signal generator includes a recorded tape player, the recorded tape having pulses recorded thereon for synchronizing the sound with the movement of each picture of the associated film.

12. Apparatus as claimed in claim 1 wherein said stereopair reproducing means includes a screen on which pictures are reproduced by means of at least one light spot varying its brightness and scanning the screen.

13. Apparatus as claimed in claim 12 wherein said stereopair reproducing means is a television receiver, and wherein said synchronizing signal generator generates synchronizing signals each time said light spot completes scanning one field.

14. Apparatus as claimed in claim 12 wherein said stereopair reproducing means is a television receiver, and wherein said synchronizing signal generator generates synchronizing signals each time said light spot completes scanning one frame.

15. Apparatus as claimed in claim 12 wherein said stereopair reproducing means comprises: an amplitude separation circuit for separating scanning signals from video signals; a differentiation circuit coupled to said scanning signals and altering the scanning signal into pulses of the same and the opposite polarities with respect to said scanning signal; a horizontal deflection control circuit triggered by said altered pulses having the same polarity of said scanning signals; a pulse selection circuit; a vertical deflection control circuit triggered by signals delivered by the pulse selection circuit; and means for producing one or more light spots to scan a picture screen, and being controlled by the horizontal and the vertical deflection control circuits;

the pulse selection circuit comprising a pulse discrimination circuit which includes a timing limit switch means, a pulse counting circuit and a lock circuit, the timing limit switch means having a least upper bound of time $h$ where $$H/2 < h < H - (h_1 - h_2) \text{ and } H - (h_2 + h_3),$$

$H$ is repetition rate of horizontal synchronizing pulses, $h_1$ is width of horizontal synchronizing pulses, $h_2$ is width of equalizing pulses, and $h_3$ is $H/2$ less by width of vertical synchronizing pulses;

said discrimination circuit receiving pulses altered from said differentiation circuit and of opposite polarity to said scanning signals, and passing only the pulses which arrive at smaller intervals the $h$, to said pulse counting circuit, the pulse counting circuit comprising two pulse counters, the first counter counting up to the same number of the equalizing pulses prior to the vertical synchronizing pulses and the second counter counting up to one more number than the first counter, at least one of said counters being reset to the initial state of counting upon each detection by the pulse discrimination circuit of time intervals in excess of the least upper bound $h$, said lock circuit locking said two counters upon attainment of full count by said first counter and by said second counter, alternately, and said lock circuit unlocking said counters upon receipt by said pulse discrimination circuit of at least one pulse corresponding to horizontal synchronizing pulses, and said pulse selection circuit delivering a vertical deflection signal to the vertical deflection control circuit upon attainment of full count by said first and said second counters alternately.

16. Apparatus as claimed in claim 15 wherein scanning signals are aligned for the first field of $(2n-1)$th frame, for the second field of $(2n-1)$th frame, for the first field of $(2n)$th frame and for the second field of $(2n)$th frame, said scanning signals being generated in sequence and cyclically, the scanning signals for each field having the sequence of a plurality of equalizing pulses, a plurality of vertical synchronizing pulses, a plurality of equalizing pulses and plurality of horizontal synchronizing pulses in order, all the vertical synchronizing pulses for the $(2n-1)$th frame having identical configuration, and the vertical synchronizing pulses for the $(2n)$th frame being same in the total number as of the vertical synchronizing pulses for the $(2n-1)$th frame, all except the first pulse of a sequence having identical or proximate configuration to the equalizing pulse and said first pulse having identical configuration as of the vertical synchronizing pulses for the $(2n-1)$th frame; the horizontal synchronizing pulses are aligned at constant time intervals; and the equalizing pulses and the vertical synchronizing pulses are aligned at one half of the time intervals of the horizontal synchronizing pulses, the $(2n-1)$th frames carrying right-eyed pictures and the $(2n)$th frames carrying left-eyed pictures of stereopairs.

17. Apparatus as claimed in claim 15 including an integration circuit coupled to and integrating said scanning signals for discriminating said $(2n-1)$th frames and said $(2n)$th frames according to the level of integrated signals of said vertical synchronizing pulses.

18. Apparatus as claimed in claim 1 wherein each liquid crystal filter of said at least one viewer device further includes at least one pair of transparent plates; and said at least one layer of liquid crystal being held in the form of film between said pair of transparent plates, the transparency of said liquid crystal film being dependent on the electric field intensity; said at least one set of transparent electrodes being so arranged to effectively change the electric field intensity to control transparency of said liquid crystal film of the filter.

19. Apparatus as claimed in claim 18 wherein two or more of said filters are laminated in one piece and a pair of the same pieces form said viewer.

20. Apparatus as claimed in claim 18 wherein each plate of said pair of transparent plates of said liquid crystal filter has a surface in contact with said liquid crystal film, said contacting surface being coated with electrically conductive and transparent material to form said set of transparent electrodes.

21. Apparatus as claimed in claim 20 wherein at least one of the electrically conductive coatings on said pair of transparent plates is uniformly semi-reflective.

22. Apparatus as claimed in claim 18 wherein one plate of said pair of transparent plates of said liquid crystal filter has a surface in contact with said liquid crystal film, said contacting surface having electrically conductive and transparent parallel lines thereon, every other line being connected to a first terminal and the remaining lines being connected to a second terminal, thereby forming said set of electrodes; and wherein the other plate of said pair of transparent plates has a surface in contact with said liquid crystal fil said contacting surface of the other plate uniformly coated with electrically conductive and transparent material and being connected to a third terminal.

23. Apparatus as claimed in claim 22 wherein the surface of said paired transparent plates, being in contact with the liquid crystal film and being uniformly coated with said electrically conductive material, is semi-reflective.

24. Apparatus as claimed in claim 18 wherein at least one plate of said pair of transparent plates of said liquid crystal filter has a surface in contact with said liquid crystal film, said contacting surface having electrically conductive and transparent parallel lines thereon, every other line being connected to one terminal and the remaining lines being connected to another terminal, thereby forming said set of electrodes.

25. Apparatus as claimed in claim 24 wherein both plates of said pair of transparent plates have surfaces provided with said set of transparent parallel line electrodes, said pair of plates being arranged at such an orientation that the parallel lines of the electrodes on said two plates are at right angles relative to each other.

26. Apparatus as claimed in claim 24 wherein one surface of said paired transparent plates which is in contact with said liquid crystal film and which is not provided with electrically conductive parallel lines, is semi-reflective.

27. Apparatus as claimed in claim 1 wherein said viewer controller comprises a switching circuit for connecting and disconnecting said electrodes of said liquid crystal filters with a power source responsive to said synchronizing signals such that the filter covering the right eye and the other filter covering the left eye of an observer alternately exchange transparency and translucency in synchronism with each other according to the synchronizing signals transmitted from said synchronizing signal generator.

28. Apparatus as claimed in claim 27 wherein said power source is a direct current source.

29. Apparatus as claimed in claim 27 wherein said power source is an alternating current source.

30. Apparatus as claimed in claim 27 wherein said switching circuit includes means for short-circuiting said electrodes of said liquid crystal filters after disconnection thereof from said power source to expedite returning said filters to transparency as soon as they are disconnected from said power source.

31. Apparatus as claimed in claim 27 wherein said switching circuit includes means for connecting said electrodes of said liquid crystal filters to an alternating current source of sufficiently high frequency to exert a quenching effect upon the associated liquid crystal film as soon as they are disconnected from said power source.

32. Apparatus as claimed in claim 27 wherein said synchronizing signals comprise two types of alternately generated synchronizing signals, and said viewer controller, further includes a signal discrimination circuit for discriminating said two types of synchronizing signals.

33. Apparatus as claimed in claim 27 wherein said switching circuit is a transfer relay.

34. Apparatus as claimed in claim 27 wherein said switching circuit includes means for applying an alternating electric field of sufficiently high frequency across said liquid crystal films of the liquid crystal filters to exert a quenching effect upon them as soon as said sets of electrodes are disconnected from said power source.

35. Apparatus as claimed in claim 34 wherein said alternating electric field of sufficiently high frequency is continuously imposed across said liquid crystal films to exert a latent quenching effect upon them at such an intensity so that the electric field applied across said sets of electrodes is not prevented from rendering the associated liquid crystal films translucent.

36. Apparatus as claimed in claim 27 wherein said switching circuit includes a flip-flop circuit, and further including a one-shot pulse generator for delivery of a one shot pulse to said switching circuit at a desired time.

37. Apparatus as claimed in claim 36 and wherein said switching circuit is a quaternary counting circuit comprised of two interconnected flip-flop circuits.

38. Apparatus as claimed in claim 36 wherein said stereopair reproducing means is a television receiver, and wherein said synchronizing signal generator generates synchronizing signals each time said light spot completes scanning one field, said synchronizing signal comprising the vertical synchronizing signal which is used to trigger the vertical deflection circuit for said television receiver, said vertical synchronizing signal being tapped out of said television receiver and transmitted to said viewer controller.

* * * * *